United States Patent
Peng

(10) Patent No.: US 9,843,576 B1
(45) Date of Patent: Dec. 12, 2017

(54) SECURE INJECTION OF CONTEXT INFORMATION IN BROWSERS

(71) Applicant: Amazon Technologies, Inc., Seattle, WA (US)

(72) Inventor: Jin Peng, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 14/973,635

(22) Filed: Dec. 17, 2015

(51) Int. Cl.
*H04L 29/06* (2006.01)
*H04L 29/08* (2006.01)
*H04L 9/32* (2006.01)

(52) U.S. Cl.
CPC .......... *H04L 63/083* (2013.01); *H04L 9/3234* (2013.01); *H04L 9/3247* (2013.01); *H04L 67/02* (2013.01); *H04L 67/42* (2013.01)

(58) Field of Classification Search
CPC . H04L 9/32; H04L 63/08; H04L 67/02; H04L 67/42
See application file for complete search history.

(56) References Cited

U.S. PATENT DOCUMENTS

| | | | |
|---|---|---|---|
| 7,877,299 B2 | 1/2011 | Bui | |
| 7,966,259 B1 | 6/2011 | Bui | |
| 7,984,170 B1* | 7/2011 | Shalla | G06F 9/546 709/217 |
| 8,160,935 B2 | 4/2012 | Bui | |
| 8,355,959 B2 | 1/2013 | Bui | |
| 8,548,917 B1* | 10/2013 | Sripracha | G06F 21/44 705/14.26 |
| 8,626,665 B2 | 1/2014 | Bui | |
| 8,689,099 B1* | 4/2014 | Hanni | H04L 67/02 715/205 |
| 9,037,963 B1 | 5/2015 | Chandi et al. | |
| 9,009,826 B1 | 8/2015 | Nichols et al. | |
| 2002/0174436 A1* | 11/2002 | Wu | H04N 7/102 725/80 |

(Continued)

OTHER PUBLICATIONS

Google Static Maps Developer Guide, available at <https://developers.google.com/maps/documentation/static-maps/intro>, accessed Dec. 9, 2015.

*Primary Examiner* — Khang Do
(74) *Attorney, Agent, or Firm* — Knobbe, Martens, Olson & Bear LLP

(57) ABSTRACT

Systems and methods are directed to enabling a client device to insert customized content from a first server into a webpage received from a second server without using an asynchronous data fetching protocol. The second server determines contextual information related to the client device and prepares a container webpage that includes an image link having one or more parameters based on the contextual information. The client device receives and uses the image link to send, to the first server, an image request with the one or more parameters and a cryptographically verifiable token generated by the second server. The first server uses the token to verify that the second server generated the one or more parameters and generates a customized image using the one or more parameters. The client device receives and renders the customized image within the container webpage without reloading the container webpage.

19 Claims, 7 Drawing Sheets

(56) References Cited

U.S. PATENT DOCUMENTS

2013/0318348 A1\* 11/2013 Lebron .............. H04L 63/0428
                                                          713/168
2015/0206215 A1    7/2015 Bui
2015/0215370 A1\*  7/2015 de la Chevrotiere ... H04L 67/02
                                                          709/203

\* cited by examiner

SECURE INJECTION OF CONTEXT INFORMATION IN BROWSERS

BACKGROUND

Many browser applications executing on computing devices, such as laptop computers, tablets, smart phones, and desktop computers, are currently able to use asynchronous data retrieval protocols to render web content dynamically on users' devices. One of the most widely supported protocols is the asynchronous-Javascripe-and-XML or "AJAX" protocol, which is run on browser applications that support and have enabled Javascript®. Typically, when a Javascripe-enabled browser application needs to obtain and render dynamic content, the browser application renders the webpage (e.g., a static container webpage), and obtains content for the page from a network content provider independently of rendering the webpage. Even though the webpage has been rendered, the browser application may dynamically change the content that is rendered without having to reload the page. For example, a browser application may receive and render a webpage with airfare prices; without having to reload the page, the browser application may thereafter receive updated airfare prices from a network server and may render those updated airfare prices without reloading the rendered page.

DETAILED DESCRIPTION

Figure 1A:
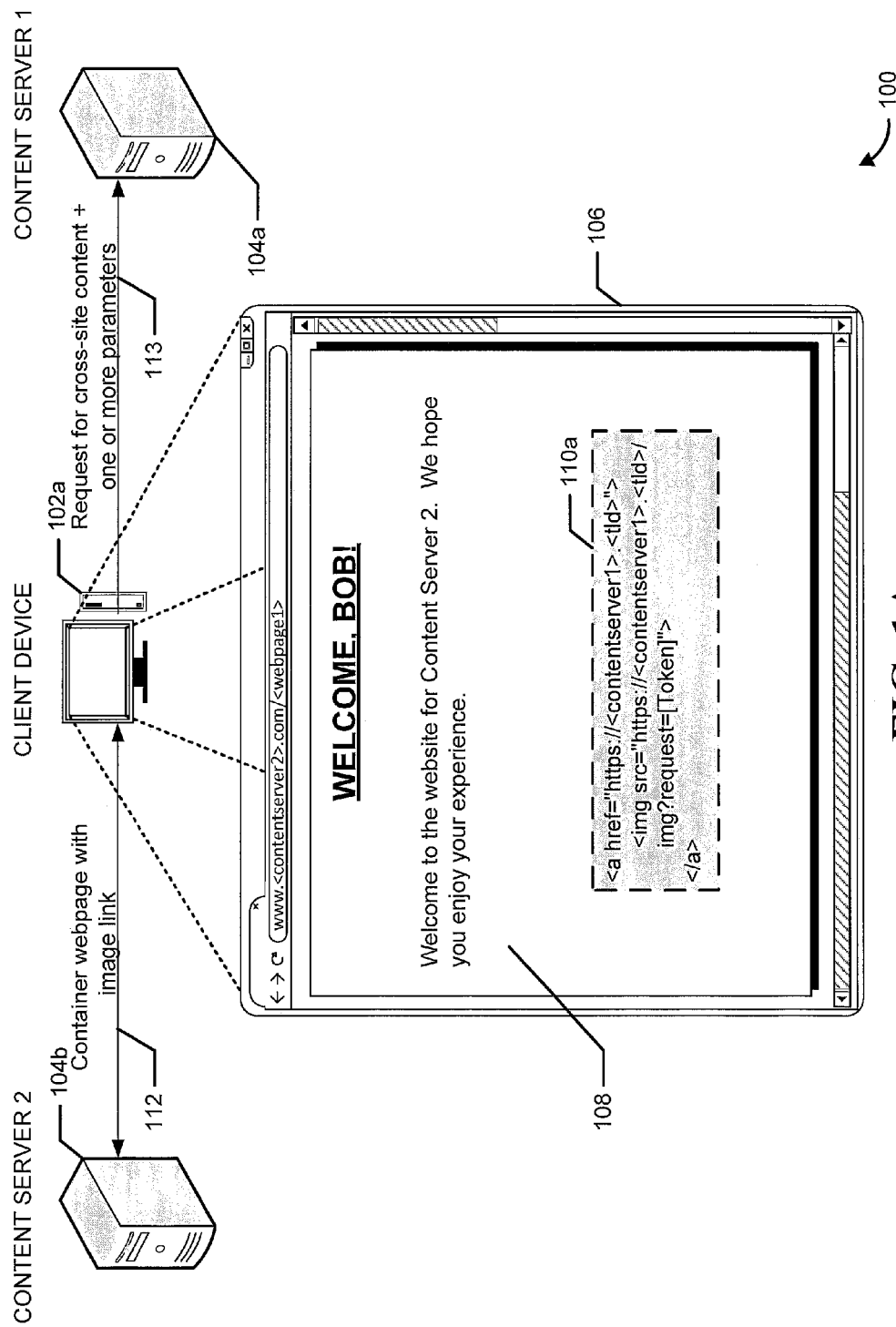
FIGS. 1A and 1B are communication system block diagrams illustrating rendering, by a client device, of a customized message received from a first content server in a webpage received from a second content server, according to some embodiments.

In some instances, a browser application may retrieve information from multiple network content providers or servers in order to obtain all of the web data needed to render a particular webpage. For example, a browser may receive webpage data from a network server. However, the webpage data received from that network server may not include all of the content that is intended to be rendered in the webpage. Other content, such as confirmation messages, advertisements, and other page objects may be stored on other network content servers (sometimes generally referred to herein as "cross-site content"). As noted above, browser applications operating on many computing devices may utilize asynchronous data fetching protocols, like AJAX and Cross Origin Resource Sharing ("CORS") protocols, to render content dynamically. However, browser applications operating on some electronic computing devices may not support these protocols, or the users of these devices may have disabled these protocols, for example, to avoid potential security risks. The browser applications of these computing devices may be unable to include content from other network content servers in the webpage without obtaining this cross-site content from the other servers and then reloading the page to display the obtained content. Users of these computing devices may experience an overall lower user experience because entire webpages must be reloaded to account for cross-site content.

In some suboptimal solutions to improve the user experience in the above situation, content servers may share content through server-to-server application-program-interface ("S2S API") calls and may provide all content needed for rendering in a webpage to the user's computing device at the same time. For example, a first content server that is providing a webpage to a client device may first contact a second content server to obtain cross-site content. The first content server may then send the webpage, including the cross-site content, to the client device in one data exchange. However, such solutions potentially require a substantial infrastructure to manage calls between many different servers, and these solutions may be inoperable in the event that servers are prevented from communicating, such as when the respective servers are operating in different networking domains and are separated by a firewall.

In overview, aspects of the present disclosure include systems and methods for enabling a client device to insert customized content from a first content server into a webpage received from a second content server in situations in which the client computing device does not support or has disabled asynchronous data fetching protocols that enable the client computing device to request content to be included in a webpage from a content server without affecting the display or behavior of an existing webpage. As noted above, examples of asynchronous data fetching protocols include, but are not limited to, AJAX, asynchronous HTML and HTTP or "AHAH," and CORE. In particular, various embodiments are directed to enabling a client device to obtain a container webpage from the second content server, obtain a dynamically created customized content from a first content server, and render the entire webpage (e.g., the container webpage and the customized content) without reloading the webpage. Such embodiments provide several advantages over other solutions, such as those described above. Specifically, various embodiments enable the client device to display customized cross-site content (1) without requiring the client device to support or have enabled asynchronous data fetching protocols such as AJAX, (2) without requiring the first and second content servers to communicate with each other directly (e.g., via S2S API calls), and (3) without requiring the client device to reload the container webpage.

As described, content servers may sometimes be referred to as a "first content server" or a "second content server." However, the terms "first" and "second" are not intended to be limiting and are, instead, merely used for ease of description. As such, a content server is not required to be limited to being only a "first content server" or a "second content server." Instead, a content server that is described as being a "first content server" in one situation or time may be referred to as a "second content server" in another situation or at another time.

As used herein, the term "container webpage" may refer to the portion of a webpage or webpage data initially received from the second content server. Such webpage data may not include cross-site content, such as content or webpage data from a first content server. In particular, in some embodiments, a client device may receive a container webpage from a second content server in response to requesting a webpage from the second content server. In such embodiments, the client device may request cross-site content from a first content server in order to render that cross-site content within or as part of the container webpage. In a non-limiting example, the client device may then request an advertisement from the first content server (e.g., cross-site content), may receive the ad, and may render the ad within the container webpage received from the second content server.

In some embodiments, the second content server may receive a request for a webpage from a client device. In response, the second content server may prepare a container webpage that includes an image link to a network location associated with a first content server. The second content server may determine contextual information related to at least one of the client device, a user of the client device, a web session maintained between the client device and the second content server, or the like. The second content server may then prepare one or more dynamic parameters based on the determined contextual information. For example, the second content server may generate a parameter that identifies the user of the client device. The second content server may include these parameters in the image link, and may send the container webpage (including the image link) to the client device.

The client device, according to some embodiments, may receive the container webpage and may begin rendering the container webpage. For example, the client device may begin downloading links in the HTML header of the webpage and textual content in the HTML body of the webpage. The client device may request cross-site content from the first content server by following the dynamic link within the webpage data received by the second content server. The client device may also provide the one or more dynamic parameters of the dynamic link to the first content server.

The first content server may receive the one or more dynamic parameters and may utilize these parameters to determine contextual message information related to at least one of the client device, the user of the client device, or the like. Continuing with the above example, the first content server may determine the identity of the user of the client device based on a parameter received from the client device. In some embodiments, the first content server may generate a customized message or other content based on the contextual message information. For example, using the user's identity, the first content server may prepare a message that is customized for the user. The first content server may include this customized message/content in an image and may provide the customized image to the client device. The client device may then render the customized image including the customized message/content as part of rendering the webpage. As a result, the client device may not have to refresh the webpage or utilize asynchronous data fetching protocols, and the first and second content servers may not have to communicate directly.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

Figure 1B:
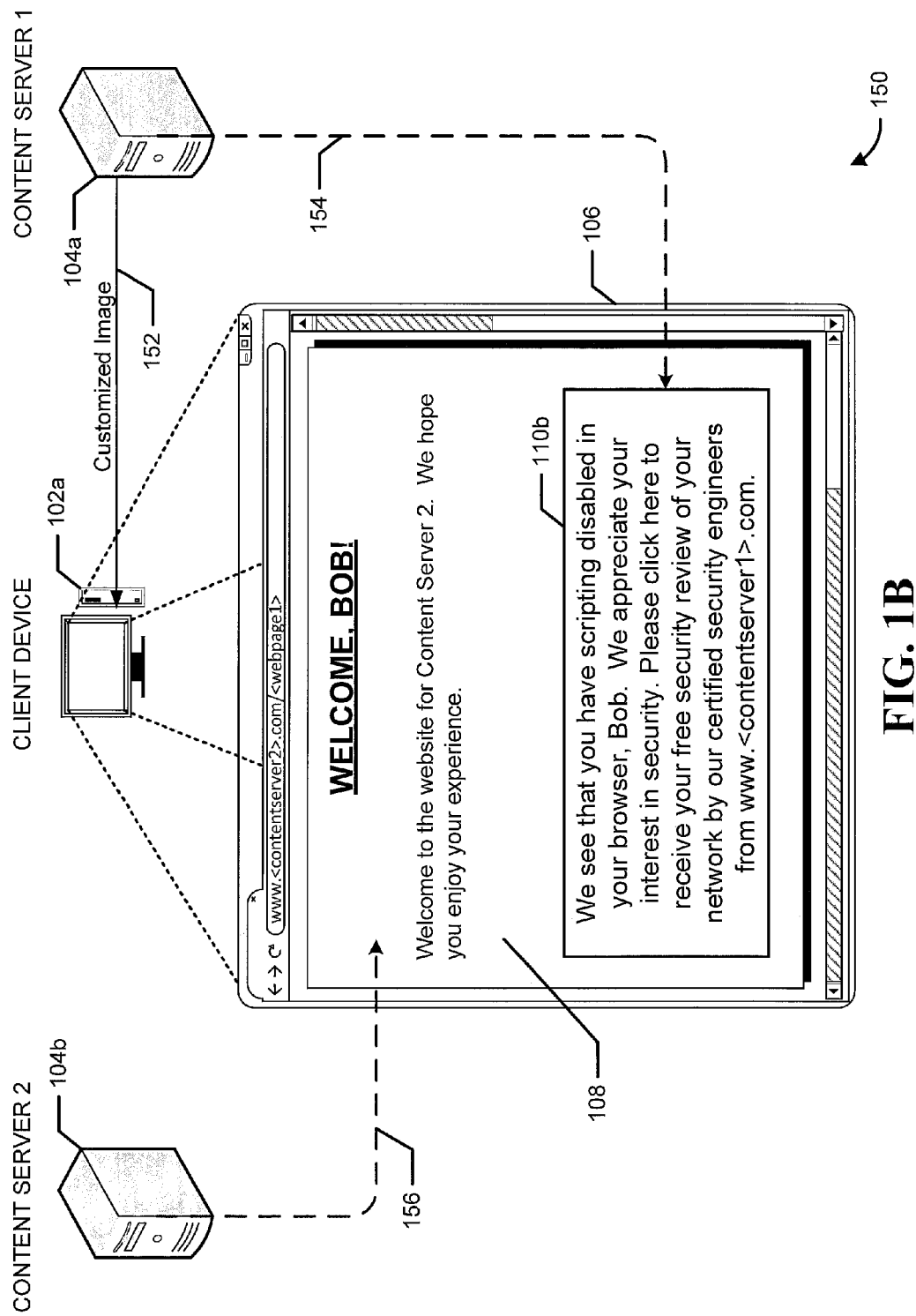

FIGS. 1A and 1B are component block diagrams of an illustrative system 100 suitable for implementing some aspects of the present disclosure. The system 100 may include a client device 102a. While illustrated in FIGS. 1A and 1B as a desktop or personal computer, those skilled in the art will recognize that the client device 102a may be any of a number of computing devices that are capable of communicating over a network and capable of requesting and rendering webpage data from network content providers. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. For example, the client device 102a may be a smartphone configured with a browser application that enables a user to request and display webpages.

In the example illustrated in FIGS. 1A and 1B, the client device 102a may be in communication with a first content server 104a and a second content server 104b via one or more network communication links (e.g., as described with reference to FIG. 2). The first content server 104a and the second content server 104b may provide access to network content, such as webpage data, image data, video data, and the like. Generally, the first content server 104a and the second content server 104b may each respond to requests for network content by retrieving the request network content from local or remote storage and providing them to the client device 102a. In some embodiments, the first content server 104a and the second content server 104b may not be in direct communication or may not be able to communicate directly. In some instances, the first content server 104a and the second content server 104b may be in separate networking domains.

With reference to the example illustrated in FIG. 1A, the client device 102a may establish a network communication link 112 with the second content server 104b. This communication link 112 may correspond with following a web address link to a network location of the second content server 104b. Via the network communication link 112, the client device 102a may request a webpage from the second content server 104b. In particular, the client device 102a may send a request to the second content server 104b for webpage data (e.g., HTML or similar mark-up data) that may enable the client device 102a to render the webpage on a display or user interface of the client device.

In some embodiments, the second content server 104b may receive the request for the webpage data via the communication link 112 and may generate a container webpage in response to the request. As further described herein (e.g., with reference to FIG. 4), the second content server 104b may determine contextual information related to the client device 102a. In some non-limiting examples, this contextual information may include an identity of the user of the client device 102a, a state of the client device 102a, a history of communications between the client device 102a and the first content server 104a or the second content server 104b, and the like. In some embodiments, the second content server 104b may receive cookie or other stateful information from the client device 102a via the communication link 112 (either as part of the request or in a separate exchange), and the second content server 104b may utilize this cookie or other stateful information to determine at least a portion of the contextual information.

The second content server 104b may generate or derive one or more parameters from the contextual information. For example, one parameter may indicate an identity of the user of the client device 102a, whereas another parameter may include a state of the client device 102a. The second content server 104b may include these one or more parameters in an image link included in the container webpage. In some embodiments, the network address associated with the image link may be the network address of the first content server 104a or an address that would enable the client device 102a to reach or access the first content server 104a. The second content server 104b may have received the network location of the first content server 104a at a previous time directly from the first content server 104a, from a third party system (not shown), a look-up table, or other centralized repository of network addresses, or the like. While the second content server 104b may be aware of the network address of the first content server 104a, the second content server 104b may or may not be in direct communication with the first content server 104a. For example, the first content server 104a may be behind a firewall or otherwise inaccessible directly from the second content server 104b. The second content server 104b may send the container webpage that includes the image link with the one or more parameters to the client device 102a via the communication link 112.

In some embodiments (e.g., as further described with reference to FIG. 1B), the second content server 104b may send the one or more parameters to the client device 102a, which may in turn send them to the first content server 104a. In such embodiments, the second content server 104b may generate the one or more parameters such that the first content server 104a may verify that the one or more parameters originated from the second content server 104b. For example, the second content server 104b may digitally sign the one or more parameters using a private key associated with the second content server 104b and may encrypt the one or more parameters using a public key of the first content server 104a. As such, the first content server 104a may utilize its secret key to decrypt the one or more parameters and authenticate the one or more parameters using the public key of the second content server 104b. The content server 104b may instead (or additionally) include a cryptographically verifiable object as one of the one or more parameters to enable the first content server 104a to authenticate the one or more parameters as a group. In some embodiments, the second content server 104b may utilize one of various other security protocols, including utilizing shared secrets known by the first content server 104a.

In various embodiment, a cryptographically verifiable object (sometimes referred to herein as an "object," a "token," or a "security token") may be created by the second content server 104b to be cryptographically verifiable by the system to which the object is to be provided (e.g., the first content server 104a) or that operates in conjunction with the system to which the object is to be provided. For example, the second content server 104b may encrypt the object so that the object is decryptable by the first content server 104a, where the ability to decrypt the object serves as cryptographic verification of the object. As another example, the object may be digitally signed (thereby producing a digital signature of the object) such that the digital signature is verifiable by the first content server 104a. In other examples, both encryption and digital signatures are used for cryptographic verifiability (and security). The key used to encrypt and/or digitally sign the object may vary in accordance with various embodiments and the same key is not necessarily used for both encryption and digital signing, where applicable. In some embodiments, a key used to encrypt the object is a private key of a public/private key pair where the public key of the key pair is maintained securely by the first content server 104a, thereby enabling the first content server 104a to decrypt the object generated by the second content server 104b using the public key of the key pair. In another embodiment, a key used to encrypt the object is a public key of a public/private key pair where the private key of the key pair is maintained securely by the first content server 104a, thereby enabling the first content server 104a to decrypt the object using the private key of the key pair. Using the public key to encrypt the object may include generating a symmetric key, using the symmetric key to encrypt the object, and encrypting the symmetric key using the public key, where the encrypted symmetric key is provided to the first content server 104a to enable the first content server 104a to use the corresponding private key to decrypt the symmetric key and use the decrypted symmetric key to decrypt the object. Further, in some embodiments, the object is digitally signed using a private key of a public/private key pair corresponding to the second content server 104a, which encrypts and/or digitally signs the object. The object may be implemented as a file, a digital artifact, or both.

The client device 102a may receive the container webpage with the image link via the communication link 112. The client device 102a may begin rendering the container webpage received from the second content server 104b (e.g., container page 108) on the display 106 of the client device 102a. In some embodiments in which the container webpage 108 is encoded in HTML by the second content server 104b, the client computing device 102a may begin parsing the header of the container page 108 (e.g., by downloading links included in the header of the container webpage 108) and may begin rendering the body of the container webpage 108. In such examples, the client computing device 102a may begin rendering the content that is already included in the container webpage 108 even though the client computing device 102a may be required to obtain some content from other content providers (e.g., cross-site content). In particular, the image link received from the content server 104 (e.g., the image link 110a) may not be rendered or may only be partially rendered at a time at which the rest of the container webpage 108 has been rendered on the display 106, as indicated by the segmented lines.

As noted, the image link 110a may indicate that at least a portion of the content to be rendered on the display 106 must be obtained from another content provider. For example, this indication may be represented as the network address of the first content server 104a (e.g., illustrated in FIG. 1A by "https://<contentserver1>.<tld>/img"). The client device 102a may send a request for the cross-site content associated with the image link 110a to the first content server 104a via a network communication link 113. As part of the request (or, alternatively, in a separate communication), the client device 102a may send the one or more parameters included in the image link 110a of the container webpage 108 received from the second content server 104b. As illustrated in the HTML code of the image link 110a, the one or more parameters may be included as part of the network address (e.g., as part of the URL address) of the first content server 104a (e.g., illustrated in FIG. 1A by the portion of the URL "request=[Token]").

With reference to FIG. 1B, the first content server 104a may parse or otherwise process the one or more parameters received from the client device 102a (e.g., via the communication link 113) in order to determine at least a portion of contextual message information related to at least the client device 102*a*. The one or more parameters may include indications regarding the identity of the user of the client device 102*a*, a state of the client device 102*a*, an action or interaction between the client device 102*a* and the second content server 104*b*, and the like. As such, the first content server 104*a* may utilize the one or more parameters to determine the identity of the user of the client device 102*a* and may utilize the identity of the user to determine contextual message information regarding messages that may be sent to the user of the client device 102*a*. Such message may include messages related to actions that the user may need to perform (e.g., account confirmations) or related to providing information that is relevant to the user (e.g., special offers or reminders). In a non-limiting example, the first content server 104*a* may utilize the one or more parameters to determine the identity of a user of the client device 102*a*. The first content server 104*a* may search a database of information related to the identified user to determine contextual information, including that the identified user is celebrating a birthday on the day in which the client device 102*a* requested the cross-site content, that the identified user has not authenticated an account within a threshold amount of time, or the like.

In some embodiments, the first content server 104*a* may generate a customized message based on the contextual message information determined from the one or more parameters received from the client device 102*a*. Thus, in such embodiments, the first content server 104*a* may generate a customized message that is personalized (e.g., sometimes referred to herein as a "personalized message") for a user of the client device 102*a*. The personalized message may include text, instructions, information, images, or other content that is personalized for or specific to the user. In the example illustrated in FIG. 1B, the first content server 104*a* may use the one or more parameters to determine that the user of the client device 102*a* is named "Bob" and that the client device 102*a* has disabled scripting. The first content server 104*a* may then generate a personalized message to Bob related to a security offer and may include this personalized message in the image 110*b* sent to the client device 102*a*. In another example, in response to determining that the user of the client device 102*a* has a birthday on the day that the client device 102*a* requested cross-site content from the first content server 104*a*, the first content server 104*a* may generate a message wishing the user a happy birthday and including a special offer for a free gift card.

In some embodiments, one or both of the first content server 104*a* and the second content server 104*b* may be associated with a commerce website. In such embodiments, the first content server 104*a* may generate a customized image for a user of the client device 102*a* related to purchasing an item through the first content server 104*a*. Because the customized image may be included in the container webpage received from the second content server 104*b*, a user of the client device 102*a* may interact with the customized image included in the container webpage to purchase an item via the first content server 102*a* without having to navigate away from the container webpage provided by the second content server 104*b*.

In some embodiments, the second content server 104*b* may operate as part of a social networking site. The second content server 104*b* may monitor the context of a post or conversation of a user of the client device 102*a*. The second content server 104*b* may generate the one or more parameters to include information relevant to the post or conversation, such as items that the user may be interested in purchasing through the first content server 104*a* based on the user's comments, posts, or conversations. As such, the first content server 104*a* may receive these one or more parameters from the client device 102*a* and may generate a customized image that includes a message related to purchasing an item related to the user's conversation, post, comments, and the like. In a non-limiting example, the second content server 104*b* may determine from a comment that the user of the client device 102*a* is interested in a particular book and, in response, may generate one or more parameters related to the book. The first content server 104*a* may receive the one or more parameters and prepare a customized image with an offer that enables the user to purchase the book without having to navigate away from the container webpage provided by the second content server 104*b*.

In another example, the container webpage may be a checkout page for the purchase of an item from the second content server 104*b*, and the customized image provided by the first content server 104*a* may be a link that a user of the client device 102*a* may need to click in order to verify the user's account information (e.g., by sending an email to the user's email account in response to the user's clicking on the link). In this example, the first content server 104*a* may utilize the one or more parameters to determine an account or an account status associated with the user of the client device 102*a*, such as whether the user has not verified his or her account within a threshold period of time.

Once the first content server 104*a* has generated the customized message, the first content server 104*a* may include that customized message in an image format. For example, the first content server 104*a* may include the text of the customized message—including, in some embodiments, customized style and formatting characteristics—into an image file, such as a graphics interchange format ("GIF"), a joint-photographic-experts-group ("JPEG") format, a tagged-image-file format ("TIFF"), or one of various other known image file formats. The first content server 104*a* may send the customized image that includes the customized message to the client device 102*a*, such as via the communication link 152.

In some embodiments, the first content server 104*a* may generate the customized message or the image that includes the customized image in a style or layout that is the same or similar to the style or layout of the container webpage that the client device 102*a* received from the second content server 104*b*. In such embodiments, the second content server 104*a* may generate the one or more parameters such that the one or more parameters include style or layout information utilized in the container webpage (e.g., links to cascading style sheets used in the container webpage). Alternatively (or additionally), As a result, the customized image may appear to a user as having been created as part of the container webpage 108.

In response to receiving the customized message, the client device 102*a* may render the customized image as part of the container webpage 108 (illustrated in FIG. 1B as the image 110*b*). Typically, a browser application operating on a client device (e.g., the client device 102*a*) may request images as part of the ordinary course of rendering a webpage and may render those images whenever the client device is able to obtain those images from a content server. Particularly, as noted above, these client devices may render portions of a webpage as soon as the content for those portions becomes available, such that each portion of a webpage is rendered only once. In some embodiments, the client device 102*a* may render the container webpage 108 received from the second content server 104*b* (as indicated by an indicator 156) and may also render the customized image 110*b* received from the first content server 104*a* within the container webpage 108 (as indicated by an indicator 154) as part of rendering the webpage as a whole. Thus, in such embodiments, because the client device 102*a* passed one or more parameters from the second content server 104*b* to the first content server 104*a*, the first content server 104*a* may be able to generate an image dynamically based on contextual information related at least to the client device 102*a* and may enable the client device 102*a* to receive and render that customized image without relying on asynchronous data retrieval protocols, without reloading the container webpage 108 and without requiring the first content server 104*a* to communicate directly with the second content server 104*b*.

In some embodiments, the first content server 104*a* and the second content server 104*b* may be configured similarly. Thus, the first content server 104*a* and the second content server 104*b* may each be configured to perform one or more of the operations respectively described with reference to the content servers 104*a* and 104*b*, depending on context. For example, as described with reference to the client device 104*b*, the first content server 104*a* may also be configured to receive a request for a webpage from the client device 102*a*, determine contextual information related to at least the client device 102*a*, generate one or more parameters based on that contextual information, and send a container webpage including an image link that includes the one or more parameters to the client device. In this example, as described with reference to the first content server 104*a*, the second content server 104*b* may similarly be configured to receive a request for cross-site content with one or more parameters from the client device 102*a*, determine contextual message information related to at least the client device 102*a* based on those one or more parameters, generate a customized message, and send a customized image that includes the customized message to the client device 102*a*.

Figure 2:
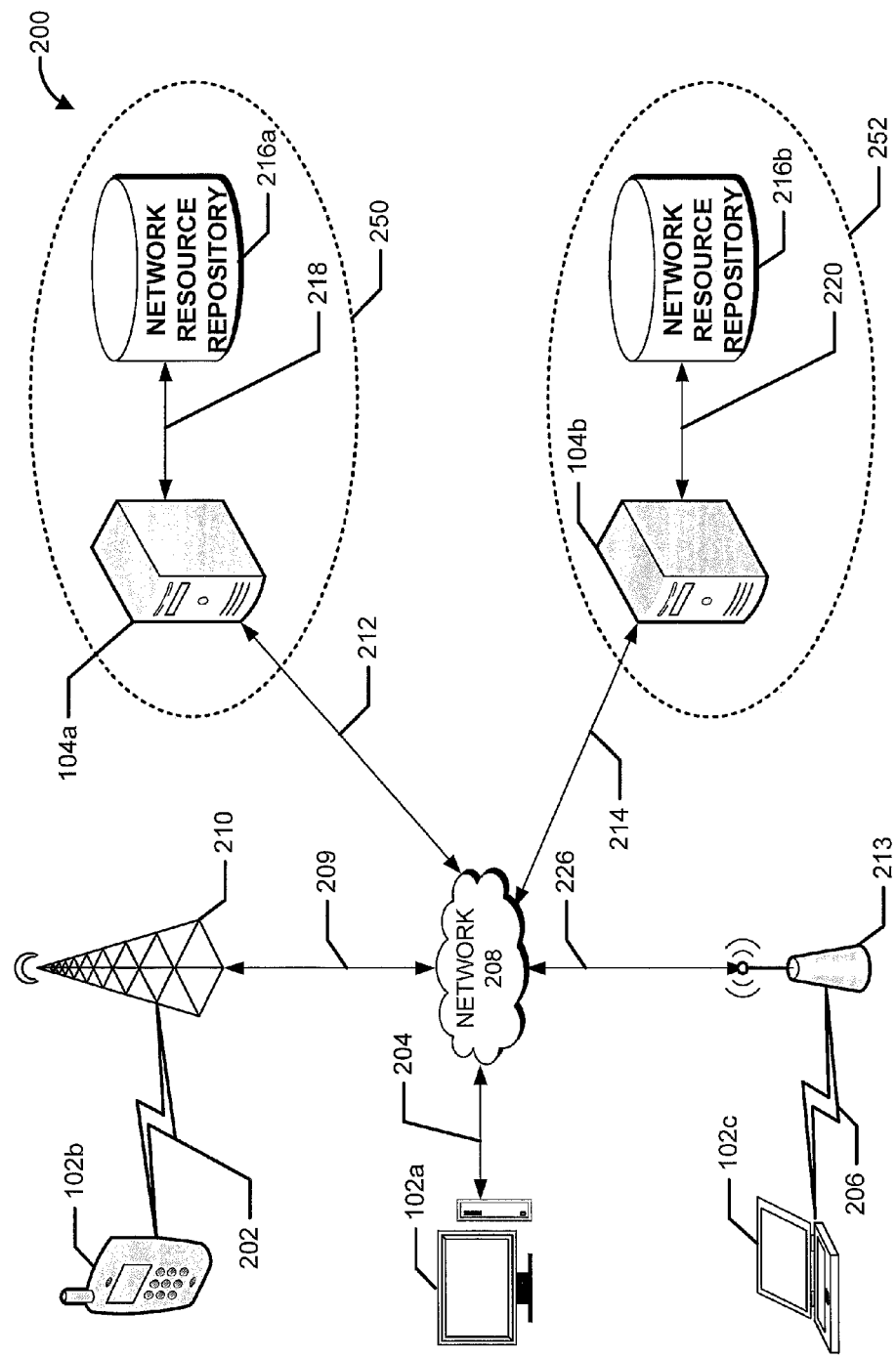
FIG. 2 is a communication system block diagram of a network suitable for use with some embodiments.

FIG. 2 is a functional block diagram of an illustrative system 200 suitable for implementing some aspects of the present disclosure. The system 200 may include one or more client devices, such as the client device 102*a* (e.g., as described with reference to FIG. 1) and one or more optional client devices 102*b* and 102*c*, which may be similar to or different from the client device 102*a*. In a non-limiting example, the client device 102*b* may be a mobile communication device, such as a smart phone or tablet, the client device 102*a* may be a desktop or personal computer, and the client device 102*c* may be a laptop computer. However, the client devices 102*a-c* may be any electronic computing device that is configured to request and render webpages from one or more content servers, such as content servers 104*a*-104*b*. For ease of description, system 200 is illustrated as including three client devices 102*a-c* and including two content servers 102*a* and 102*b*. However, the system 200 may include one or more client devices and two or more content servers without loss of scope.

In the system 200, the computing devices 102*a-c* may each communicate with the content servers 104*a-b* by exchanging data and other information via a network 208. In an example, the client device 102*b* may communicate over the network 208 via a cellular link 202 to a cellular base station 210 that may maintain a wired link 209 to the network 208. The computing device 102*a* may send communications directly to the network 208 via wired link 204. The computing device 102*c* may communicate through the network 208 via a wireless connection 206 to a wireless access point 213 (e.g., a wireless router) that communicates with the network 208 via the wired link 226.

In some embodiments, the network 208 may route or forward requests for webpages or cross-site content from the client devices 102*a-c* to the first content server 104*a* and the second content server 104*b* (e.g., as described with reference to FIGS. 1 and 2) via communication links 212 and 214, respectively. In response, the content servers 104*a-b* may receive and respond to requests for webpages, requests for cross-site content, and one or more parameters from the one or more of the client devices 102*a-c*.

In a non-limiting example, the client device 102*a* may identify a network location of the second content server 104*b* in order to send a request to the second content server 104*b* for webpage data via the network 208. The client device 102*a* may follow a Uniform Resource Locator ("URL") link or web address of the second content server 104*b* to send the request for a webpage hosted on the second content server 104*b*. For instance, the client device 102*a* may follow a follow a URL "http://www.<contentserver2>.com/<webpage1>" to access a webpage "<webpage1>" located at the network address of the content server 104*b* ("www.<contentserver2>.com") using the HTTP protocol ("http://"). In some embodiments, the request may correspond to an HTML GET request, an HTML POST request, or one of various known methods of requesting a webpage. In response to receiving the webpage request from the client device 102*a*, the second content server 104*b* may generate a container webpage for the requested webpage resource (e.g., "<webpage1>"). The second content server 104*b* may further determine contextual information related to at least the client device 102*a* (e.g., as described with reference to FIG. 1A) and may generate one or more parameters based on that contextual information. The second content server 104*b* may include these one or more parameters in an image link to a network address of the first content server 104*a*. For example, the image link may be "http://www.<contentserver1>.com/img?request=[TOKEN]", wherein "http://www.<contentserver1>.com/img" represents the network location of an image resource "img" hosted on the first content server 104*a* and "request=[TOKEN]" represents the one or more parameters. The second content server 104*b* may include this image link in the container webpage that is provided to the client device 102*a* via the network 208.

Continuing with the above example, in response to receiving the container webpage that includes the image link, the client device 102*a* may begin rendering the container webpage. The client device 102*a* may utilize the network address of the first content server 104*a* indicated in the image link (e.g., "http://www.<contentserver1>.com/img") to request an image resource to be rendered in the container webpage received from the second content server 104*b*, via the network 208. As part of the request or in a separate communication, the client device 102*a* may provide the one or more parameters included in the image link (e.g., "request=[TOKEN]") to the first content server 104*a*. The first content server 104*a* may utilize the one or more parameters to determine contextual message information regarding at least the client device 102*a* and may generate a customized image based on that contextual information (e.g., as described with reference to FIG. 1B). The first content server 104*a* may provide the customized image to the client device 102*a*, via the network 208, and the client device 102*a* may render the customized image within the container webpage received from the second content server 104*b*.

The first content server 104a may operate in a first networking domain 250, and the second content server 104b may operate in a second networking domain 252. The first networking domain 250 may be distinct from the second networking domain 252. With reference to the above example, the first networking domain 250 may correspond to "www.<contentserver1>.com," whereas the second networking domain 252 may correspond to "www.<contentserver2>.com." In some embodiments, the first content server 104a may be unable to communicate with the second content server 104b, such as via the network 208. For example, a firewall (not shown) may prevent communications passing between the first networking domain 250 and the second networking domain 252.

In some embodiments, the first content server 104a may be in communication with a first network resource repository 216a, which may include one or more network resources that the first content server 104a may provide to one or more of the client devices 102a-c on request. For example, the network resource repository may store webpage data, image data, video data, and the like. Similarly, the second content server 104b may be in communication with a second network resource repository 216b, which may store one or more network resources.

In some embodiments (not shown), one or more of the client devices 102a-c may send requests to one or more of the content servers 104a-b through one or more proxy servers. In such embodiments, the one or more proxy servers may receive the requests from the one or more client devices 102a-d and may forward these requests to one or more of the content servers 104a-b. Similarly, the one or more proxy servers may receive responses from the one or more content servers 104a-b and may forward those responses to the appropriate client device 102a-c.

The network 208 may be any wired network, wireless network, or combination thereof. In addition, the network 208 may be a personal area network, local area network, wide area network, cable network, satellite network, cellular telephone network, etc. or combination thereof. In addition, the network 208 may be a personal area network, local area network, wide area network, over-the-air broadcast network (e.g., for radio or television), cable network, satellite network, cellular telephone network, or combination thereof. For example, the network 208 may be a publicly accessible network of linked networks, possibly operated by various distinct parties, such as the Internet. In some embodiments, the network 208 may be private or semi-private networks, such as a corporate or university intranets. The network 208 may include one or more wireless networks, such as a Global System for Mobile Communications (GSM) network, a Code Division Multiple Access (CDMA) network, a Long Term Evolution (LTE) network, or some other type of wireless network. The network 208 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

Figures 3A, 3B:
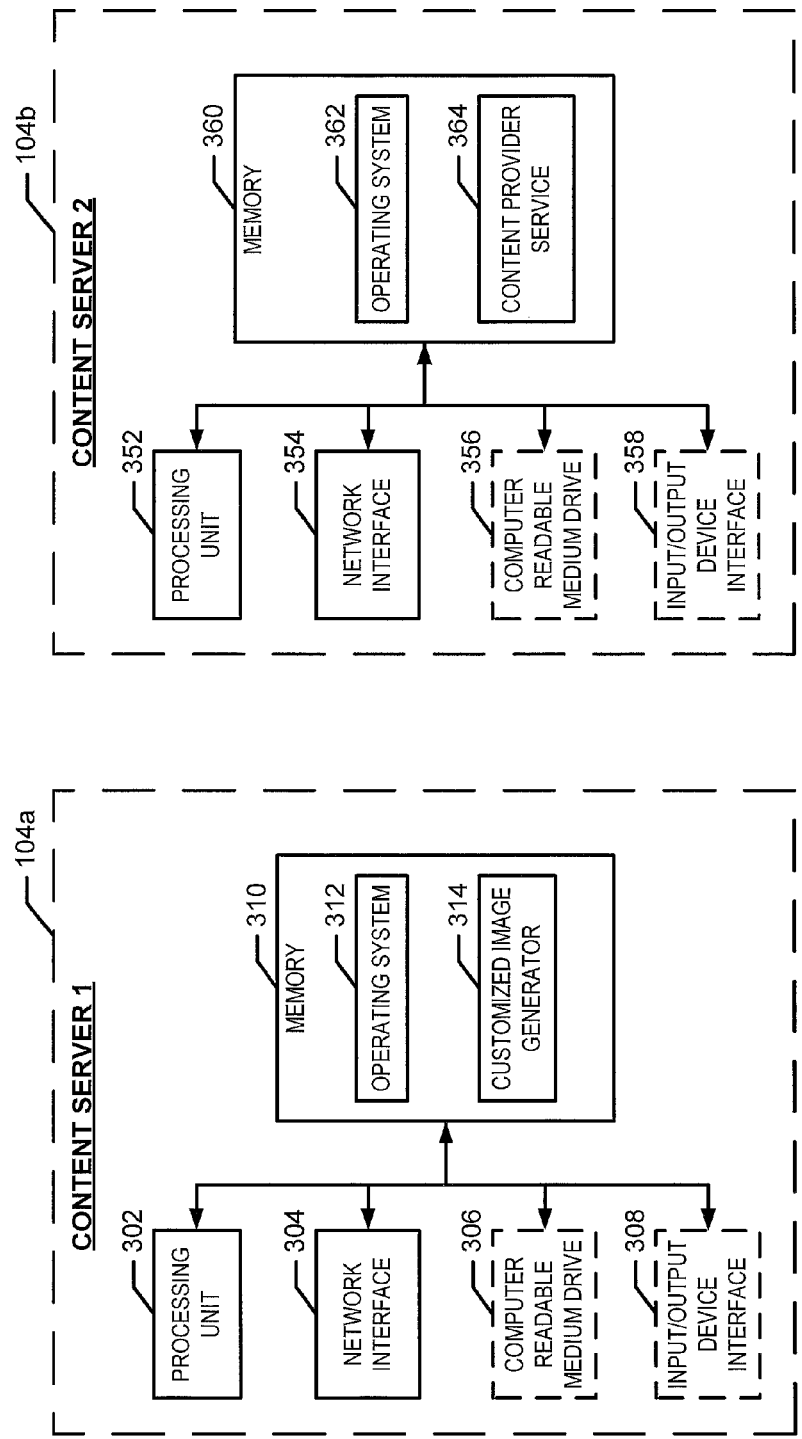
FIG. 3A is a component diagram of an example first content server suitable for use with some embodiments.
FIG. 3B is a component diagram of an example second content server suitable for use with some embodiments.

FIG. 3A depicts a general architecture of the first content server 104a, which—as described above with reference to FIGS. 1A, 1B, and 2—may be configured to respond to image requests received from client devices by dynamically generating customized images based on one or more parameters received with the image requests. The general architecture of the first content server 104a depicted in FIG. 3A includes an arrangement of computer hardware and software components that may be used to implement aspects of the present disclosure. The first content server 104a may include many more (or fewer) elements than those shown in FIG. 3A. It is not necessary, however, that all of these generally conventional elements be shown in order to provide an enabling disclosure.

As illustrated, the first content server 104a includes a processing unit 302, a network interface 304, a computer readable medium drive 306, and an input/output device interface 308, all of which may communicate with one another by way of a communication bus. The network interface 308 may provide connectivity to one or more networks (e.g., the network 208) or computing systems and, as a result, may enable the first content server 104a to receive and send information and instructions from and to other computing systems or services. For example, the first content server 104a may receive requests for cross-site content (e.g., image data) from a client device with the network interface 304, and the processing unit 302 may, in response, send customized images to the requesting client device over a network using the network interface 304.

The processing unit 302 may also communicate to and from memory 310. The memory 310 may contain computer program instructions (grouped as modules or components in some embodiments) that the processing unit 302 may execute in order to implement one or more embodiments. The memory 310 generally includes RAM, ROM, and/or other persistent, auxiliary, or non-transitory computer-readable media. The memory 310 may store an operating system 312 that provides computer program instructions for use by the processing unit 302 in the general administration and operation of the first content server 104a. The memory 310 may further include computer program instructions and other information for implementing aspects of the present disclosure. For example, in some embodiments, the memory 310 may include a customized image generator 314, which may be executed by the processing unit 302 to perform various operations, such as those operations described with reference to FIGS. 1A, 1B, 2, and 5.

In some embodiments, the customized image generator 314 may implement various aspects of the present disclosure. For example, the customized image generator 314 may receive a request for an image, as well as one or more parameters, from a client device (e.g., the client device 102a described with reference to FIGS. 1A, 1B, and 2). The one or more parameters may have been initially generated on another content server (e.g., the second content server 104b as described with reference to FIGS. 1A, 1B, and 2). In such embodiments, the customized image generator 314 may process the one or more parameters to determine contextual information related to at least the requesting client device. The contextual information may include an identity of the user of the requesting client device, an action the user is required to take in order to complete a transaction (e.g., verifying a purchase or an account), current operating states of the requesting client device, biographical information related to the user of the requesting client device, a history of transactions (with the first content server 102a or another content server) related to the requesting client device or the user of the requesting client device, and the like.

In some embodiments, the one or more parameters may include information regarding the content server that generated these parameters. The customized image generator 314 may authenticate that the one or more parameters originated from this content server, such as by utilizing a public/private key pair or a shared secret associated with the first content server 104a and the other content server.

In some embodiments, the customized image generator 314 may generate a customized or personalized message based on the one or more parameters received from the requesting client device. In some non-limiting examples, the customized message may include an imperative message with instructions for the user of the requesting user to take (e.g., to verify an account or transaction), a declaratory statement (e.g., a message wishing the user a happy birthday), or another customized statement. The customized image generator 314 may generate a customized image utilizing the customized message, such as by converting the text of the customized message into an image format. The customized image generator 314 may then provide the customized image to the requesting client device for rendering on the requesting client device's display or user interface.

In some instances, the customized image generator 314 may determine, based on the contextual information derived from the one or more parameters, that no customized message is needed. For example, the customized image generator 314 may generate customized messages in response to determining that the user of the requesting client device must take an action to complete a transaction. As such, in situations in which the user of the requesting client device does not need to take that action (e.g., because the user has already taken the action), the customized image generator 314 may generate a customized image that includes no customized message or content. For example, the customized image generator 314 may generate a white or transparent image and may provide this "content-less" image to the requesting client device for rendering.

While the customized image generator 314 is illustrated as a distinct module in the memory 310, in some embodiments, the customized image generator 314 may be incorporated as a module in the operating system 312 or another application or module, and as such, a separate customized image generator 314 may not be required to implement some embodiments. In some embodiments, the customized image generator 314 may be implemented as part of a common web service (e.g., an HTTP web service).

FIG. 3B depicts a general architecture of the second content server 104*b*, which—as described above with reference to FIGS. 1A, 1B, and 2—may be configured to communicate with one or more client devices (e.g., the client device 102*a-c* as described with reference to FIG. 2). As described with reference to the first content server 104*a*, the general architecture of the second content server 104*b* depicted in FIG. 3B includes an arrangement of computer hardware and software components that may be used to implement aspects of the present disclosure, and the second content server 104*b* may include more or fewer elements than those shown in FIG. 3B. In particular, it is not necessary for all of these elements be shown in order to provide an enabling disclosure.

As illustrated, the second content server 104*b* includes a processing unit 352, a network interface 354, a computer readable medium drive 356, and an input/output device interface 358, all of which may communicate with one another by way of a communication bus. The network interface 358 may provide connectivity to the one or more client devices via a network connection. As such, in some embodiments, the network interface 358 may receive requests for webpage data from one or more client devices.

The processing unit 352 may communicate to and from memory 360. The memory 360 may contain computer program instructions (grouped as modules or components in some embodiments) that the processing unit 352 may execute in order to implement one or more embodiments. The memory 360 may include one or more types of memory, such as RAM, ROM, and/or other persistent, auxiliary or non-transitory computer-readable media. The memory 360 may store an operating system 362 that provides computer program instructions for use by the processing unit 362 in the general administration and operation of the second content server 104*b*. The memory 360 may further include computer program instructions and other information for implementing some aspects of the present disclosure. For example, in some embodiments, the memory 360 may include a content provider service 364, which may be executed by the processing unit 362 to perform operations, such as those operations described with reference to FIGS. 1A, 1B, and 2.

In some embodiments, the content provider service 364 may implement some aspects of the present disclosure. For example, the content provider service 364 may receive a request for a webpage from a client device (e.g., the client device 102*a* as described with reference to FIGS. 1A, 1B, and 2). In response, the content provider service 364 may prepare a container webpage that includes an image link to a network location associated with a first content server. The content provider service 364 may also determine contextual information related to at least one of the client device, a user of the client device, a web session maintained between the client device and the second content server, or the like. The content provider service 364 may then prepare one or more parameters based on the determined contextual information. The content provider service 364 may include these parameters in the image link, and may send the container webpage (including the image link) to the client device. In some embodiments, the content provider service 364 may encrypt the one or more parameters to enable another content server (e.g., the first content server 104*a*) to authenticate that the content provider service 364 generated the one or more parameters.

While the content provider service 364 is illustrated as a distinct module in the memory 360, in some embodiments, the content provider service 364 may be incorporated as a module in the operating system 362 or another application or module (not shown), and as such, a separate content provider service 364 may not be required to implement some embodiments.

In some embodiments, the second content server 104*b* may include a customized image generator, such as the customized image generator 314 described with reference to the first content server 104*a*. Similarly, the first content server 104*a* may include a content provider service, such as the content provider service 364 described with reference to the second content server 104*b*. In such embodiments, the content servers 102*a* and 102*b* may each include the components discussed above and may be configured to perform operations described with reference to the various embodiments.

Figure 4:
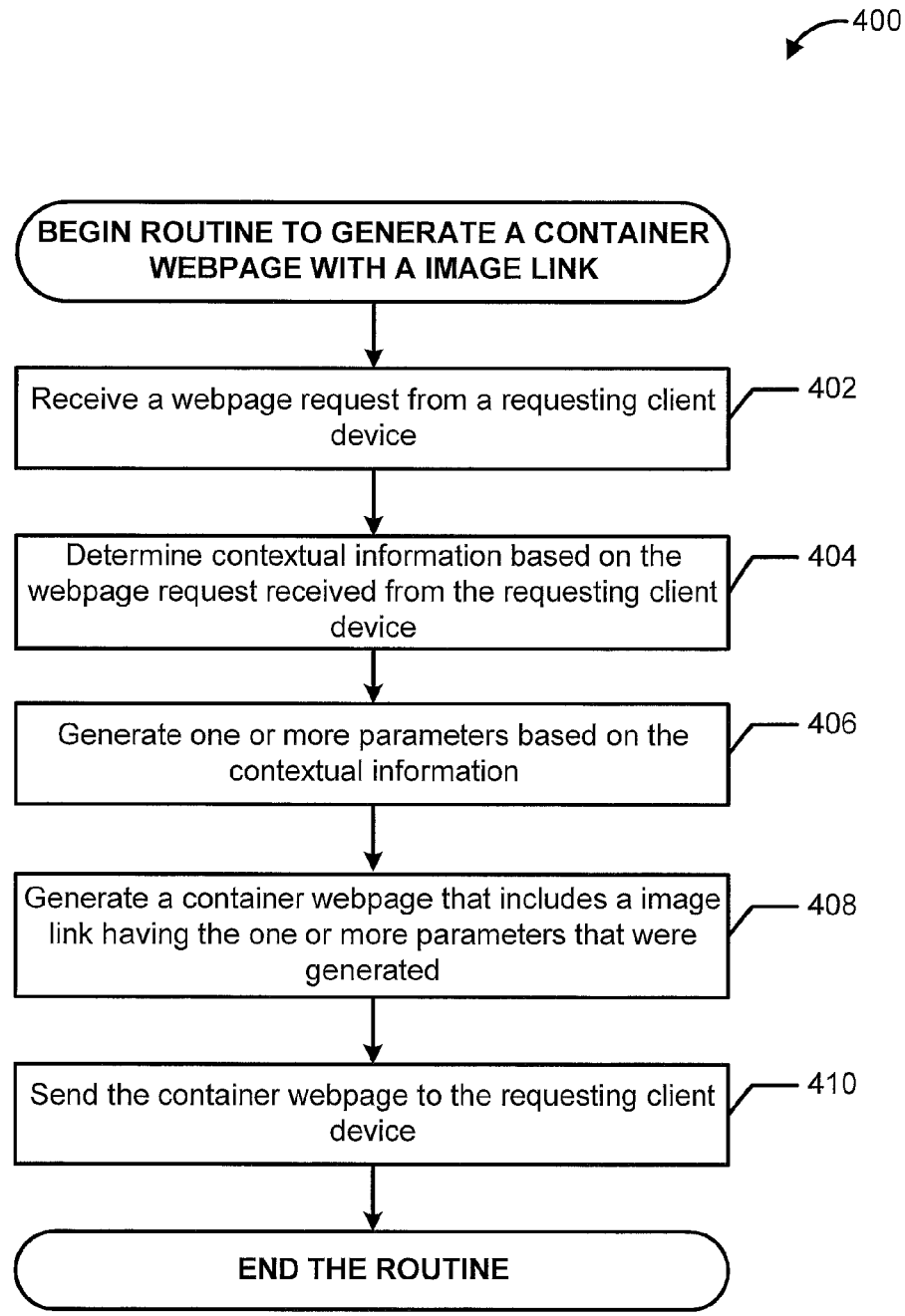
FIG. 4 is a process flow diagram illustrating a computer-implemented method for generating a container webpage with an image link, according to some embodiments.

FIG. 4 is a process flow diagram of an illustrative routine 400 for generating a container webpage with an image link, according to some embodiments. The routine 400 may be implemented with a content provider service operating on a content server (e.g., the content provider service 364 of the second content server 104*b* as described with reference to FIG. 3B). The routine 400 may correspond to one or more operations attributed to the second content server 104*b* in reference to the description of FIGS. 1A, 1B, 2, and 3B.

Thus, with reference to FIG. 4, the content provider service 364 may receive a webpage request from a client device via a network connection, in block 402. In some embodiments, the content provider service 364 may have access or may be able to obtain network resources, such as webpage data, and may provide these resources to a requesting client device. In an example, the content provider service 364 may receive an HTML GET or HTML POST request from the requesting client device. These requests may indicate a particular network resource or webpage hosted on the second content provider 104b that the client device is attempting to obtain.

In block 404, the content provider service 364 may determine contextual information based on the webpage request received from the client device in block 402. In some embodiments, the content provider service 364 may analyze the request to determine information about at least the requesting computing device, such as a user associated with the requesting computing device, a history of communications between the requesting computing device and the second content server 104b.

In some embodiments of the operations performed in block 402, the content provider service 364 may receive cookie or stateful information from the requesting client device within the webpage request or as part of as separate communication. As such, as part of determining the contextual information in block 404, the content provider service 364 may utilize the cookie or stateful information received from the requesting client device. For example, the content provider service 364 may receive a cookie from the requesting client device indicating an identity of the user of the requesting device or a browsing history of the requesting device.

In block 406, the content provider service 364 may generate one or more parameters based on the contextual information determined in block 404. In a non-limiting example, the content provider service 364 may generate parameters based on an identification number of the requesting client device, a transaction number associated with the requesting client device, or other identifying or descriptive information regarding the current or previous state or actions of the requesting client device. In some embodiments, the content provider service 364 may not communicate or may not be able to communicate directly with the other content server. For example, the content provider service 364 may operate within a second network domain that is prevented from access a first network domain in which the other content server operates.

In some embodiments of the operations performed, the content provider service 364 may generate security information as part of the one or more parameters, in block 404. This security information may enable another content server (e.g., the first content server 104a) to verify or authenticate that the one or more parameters were generated by the second content server 104b. In some instances, the security information may include secret key or public/private key information signed with information specific to the second content server 104b. For example, the content provider service 364 may generate a security token or other secure message that is signed with the private key of the second content server 104b, which may enable another content server to decrypt, and as a result authenticate, the security token included with the one or more parameters using a public key for the second content server 104b. In another example, the content provider service 364 may include the one or more parameters as part of a security token or message.

Alternatively, or additionally, the content provider service 364 may generate timing information (e.g., a time of expiration) specifying a time at which the one or more parameters may become invalid. Specifically, the timing information, which may be included in a security token or included in a separate message within the one or more parameters, may indicate a time at which the one or more parameters are set to "expire" or to no longer be valid. In such embodiments, the timing information may be utilized by other content servers to determine whether they are receiving requests that may be out of date, no longer valid, or submitted by an authorized third party at some later point in time. Thus, the timing information may ensure that the one or more parameters are bound to the time period defined in the timing information.

Further, in some embodiments, the content provider service 364 may generate information that may indicate that the one or more parameters are only to be used a certain number of times (e.g., one time). As a result, other content servers that receive the one or more parameters from a client device may be able to determine whether the one or more parameters should be utilized to generate a customized or personalized message that is returned to the client device as an image. For example, in response to determining that the one or more parameters that have been received from the client device have already been received a threshold number of times indicated in information included in the one or more parameters, the other client server may not send an image with a customized message to the client device. However, the other content server may send an image that includes a customized message to the client device in response to determining that the one or more parameters have not been received or used a threshold number of times.

In block 408, the content provider service 364 may generate webpage date for a container webpage such that the container webpage includes an image link having the one or more parameters generated in block 406. In some embodiments, the content provider service 364 may generate or obtain a container webpage related to the webpage requested received from the requesting client device. For example, in response to receiving a request for a "Home" page in block 402, the content provider service 364 may obtain or generate a container page related to the requested "Home" page. The container page, in some embodiments, may include various webpage data (e.g., HTML or other markup information) that may enable the requesting device to render the container page.

The content provider service 364 may insert an image link into the container webpage generated in block 408, and the image link may include a URL indicating the network address for an image hosted by another content server (e.g., the first content server 104a). In some embodiments, the content provider service 364 may determine the network address of the first content server 104a, for example, based on a preexisting relationship between the second content server 104b and the first content server 104a. Specifically, the second content server 104b may aware that the requesting client device will need to obtain at least some portion of content from the first content server 104a for rendering within the container webpage. In an example, the second content server 104b may host news webpages and the first content server 104a may provide advertisements that are inserted in the new webpages hosted on the second content server 104b. Further, the content provider service 364 may include the one or more parameters generated or obtained in block 406 within the image link. As described (e.g., with reference to FIG. 2), these parameters may be included within the URL of the image link such that the requesting client device may provide the one or more parameters to the first content server 102a as part of a request for the image (e.g., as part of an HTML GET request).

The content provider service 364 may send the container webpage (including the image link) to the client device, in block 410, and may subsequently terminate the routine 400.

Figure 5:
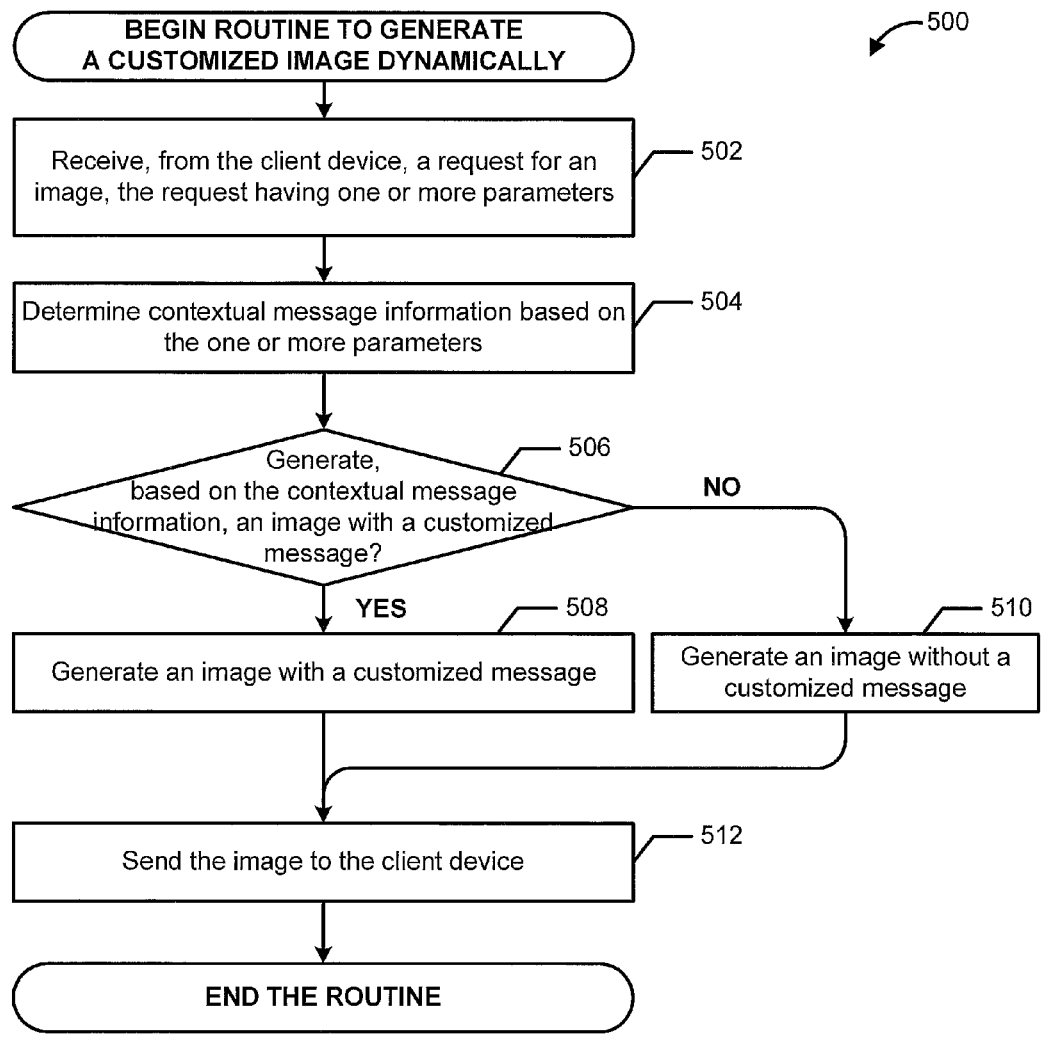
FIG. 5 is a process flow diagram illustrating a computer-implemented method for generating a customized image dynamically, according to some embodiments.

FIG. 5 is a process flow diagram of an illustrative routine 500 for generating a customized image dynamically, according to some embodiments. The routine 500 may be implemented with a customized image generator operating on a content server (e.g., the customized image generator 314 of the first content server 104a as described with reference to FIG. 3A). The routine 500 may correspond to one or more operations attributed to the first content server 104a in reference to the description of FIGS. 1A, 1B, 2, and 3A.

In block 502, the customized image generator 314 may receive, from a requesting client device (e.g., the client device 102a), a request for an image. In some embodiments, the request may include one or more parameters (e.g., the one or more parameters generated by the content provider server 364 in block 406 as described with reference to FIG. 4). For example, the customized image generator 314 may receive an HTML GET request from the requesting client device, and the HTML GET request may include the URL of the requested image. The URL may include the network address of the requested image, as well as the one or more parameters. In some embodiments, the customized image generator 314 may receive the one or more parameters in cookie or stateful information or in a separate communication received from the requesting client device.

In block 504, the customized image generator 314 may determine contextual message information based on the one or more parameters received in block 502. In some embodiments, the customized image generator 314 may analyze the one or more parameters to determine various identifying information related to at least the requesting client device, such as an identification number or session identification. In response to identifying at least the requesting client device, the customized image generator 314 may determine contextual message information related to the requesting client device. In a non-limiting example, the contextual message information may indicate information related to actions the requesting client device may need to perform. For example, these actions may include verifying a purchase to complete a transaction with the second content server 104b, confirming a change of information associated with an account with the second content server 104b, clicking on a link, or the like. Alternatively (or additionally), the contextual message information may describe non-interactive messages that may be sent to the user of the requesting client device based on identifying information related to the user. For example, the contextual message information may indicate consumer items the user may be interested in, information regarding an account of the user (e.g., a current balance with an account maintained by the first content server 104a), and the like.

In some embodiments of the operations performed in block 504, the customized image generator 314 may verify or validate that the one or more parameters originated from or were generated by the second content server 104b. In such embodiments, the customized image generator 314 decrypt the one or more parameters using a shared secret, a public/private key pair, or various other known security techniques to authenticate that the second content server 104b generated the one or more parameters. In particularly, the customized image generator 314 may authenticate the one or more parameters without communicating with the second content server 104b. As a result, the first content server 104a may determine whether an authorized third party has modified or generated one or more of the parameters without permission or authorization.

In some embodiments in which the one or more parameters includes timing information, the customized image generator 314 may analyze the timing information to determine whether the request for an image received from the client device is untimely. Particularly, the customized image generator 314 may determine an amount of time from a point in time indicated in the timing information (e.g., a five minute period of time starting from a certain time) has expired or, alternatively, whether a point in time indicated in the timing information has passed. In response to determining that the one or more parameters are not authentic, have been modified with permission, did not originate at another content server that is trusted, or have expired, the customized image generator 314 may—in some embodiments not shown in the example illustrated in FIG. 5—send the client device an image without customized or personalized content or not send the client device any image.

In decision block 506, the customized image generator 314 may determine whether to generate an image with customized context based on the contextual information determined in block 504. In particular, the customized image generator 314 may determine, based on the contextual message information, whether to send a message to the requesting client device prompting the requesting client device to take an action or providing information to the requesting client device.

In response to determining to generate an image with a customized message (e.g., decision block 506="YES"), the customized image generator 314 may generate an image with a customized message, in block 508. For example, in response to determining, based at least in part from the contextual message information, that a user of the requesting client device has not confirmed the user's account managed by the first content server 104a within a threshold amount of time, the customized image generator 314 may determine that a message prompting the user to confirm his or her account should be sent to the requesting client device.

In response to determining not to generate an image with a customized message (e.g., decision block 506="NO"), the customized image generator 314 may generate an image without a customized message, in block 510. In particular, as described above, the customized image generator 314 may generate a blank or transparent image that includes no message. Alternatively, the customized image generator 314 may generate a generic image that is not specifically directed to the requesting client device. In some embodiments of the operations performed in block 510, the customized image generator 314 may generate a small image, such as an image that is 1×1 pixels in size. In such embodiments, the small image may be imperceptible or almost imperceptible when rendered on the requesting client device's display.

In block 512, the customized image generator 314 may send the image generated in either block 508 or block 510 to the requesting client device. Subsequently, the customized image generator 314 may end the routine 500.

Figure 6:
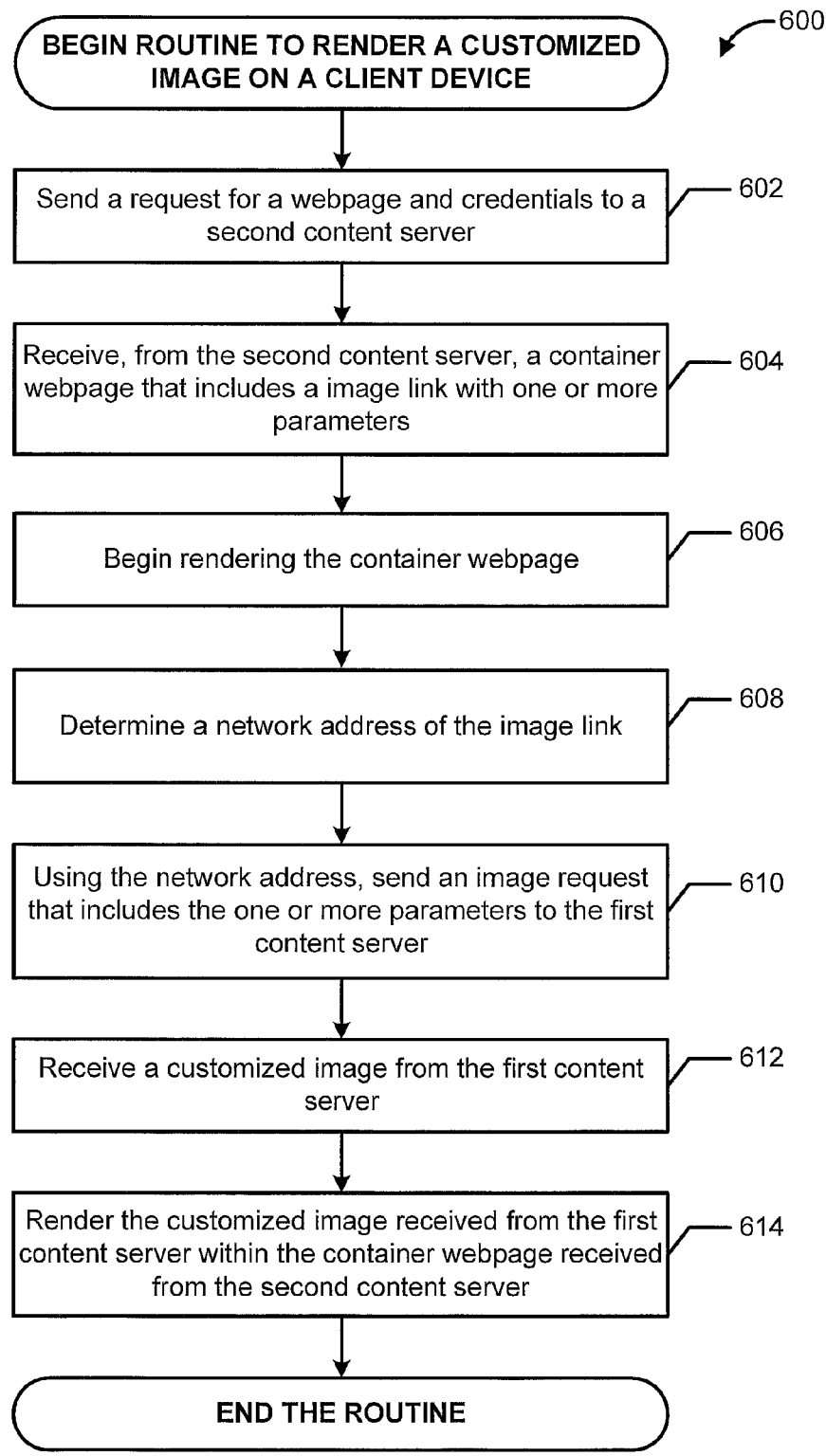
FIG. 6 is a process flow diagram illustrating a computer-implemented method for rendering a customized image on a client device, according to some embodiments.

FIG. 6 is a process flow diagram of an illustrative routine 600 for rendering a customized image on a client device, according to some embodiments. The routine 600 may be implemented with a browser application operating on a client device (e.g., the client device 102a as described with reference to FIGS. 1A, 1B, and 2).

In block 602, the browser application may send a request for a webpage to a content server (e.g., the second content server 104b). In some embodiments, the request may include credentials from the client device 102a, such as an identification number associated with the client device 102a or a user of the client device 102a. Credentials may also (or alternatively) include a browsing history of the client device 102a, a session identification number, an account number, etc. These credentials may be sent as part of the request or in a separate communication with the second content server.

In block 604, the browser application may receive, from the second content server 104b, a container webpage that includes an image link with one or more parameters. As described (e.g., with reference to FIG. 4), the image link may include a URL to an image resource hosted on the first content server 104a. The URL may include the network address of the image resource, as well as one or more parameters that the second content server 104b generated based on contextual information determined to be related to at least the client device 102a.

The browser application may begin rendering the container webpage, in block 606. In some embodiments in which the container webpage is an HTML webpage, the browser application may begin processing the header portion of the container webpage, such as by visiting network addresses indicated by links included in the header portion of the container webpage to download resources. After processing the header portion of the container webpage, the browser application may begin rendering content included in the body of the container webpage.

In some embodiments, the browser application may render content within the body while, at the same or near the same time, attempting to obtain the image associated with the image link included in the container webpage. As such, in block 608, the browser application may determine a network address of the image link, such as by parsing the URL included in the image link to determine the network address of the first content server 104a. In block 610, the browser application may use the network address of the image link to send a request for the dynamic image to the first content server 104a. In some embodiments, the request sent in block 610 may include the one or more parameters obtained in block 604. In other embodiments, the browser application may send the one or more parameters to the first content server in a separate communication.

In block 612, the browser application may receive a customized image from the first content server. As described (e.g., with reference to FIG. 5), the customized image may or may not include a customized message. The browser application may render the customized image received from the first content server within the container webpage received from the second content server, in block 614. In an example in which the customized image includes a customized message directed to a user of the client device 102a, the browser application may render the image on the display in order to display the customized message to the user of the client device 102a. Subsequently, the browser application may end the routine 600.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
a first content server comprising one or more first processors and a second content server comprising one or more second processors, the first content server configured with processor-executable instructions to perform operations comprising:
receiving, from a client device associated with a user, a hypertext transfer protocol (HTTP) request for an image, wherein the HTTP request comprises a cryptographically verifiable token and one or more parameters, wherein:
the cryptographically verifiable token and the one or more parameters are generated by the second content server,
the cryptographically verifiable token is encrypted so as to be decryptable by the first content server, and
an ability of the first content server to decrypt the cryptographically verifiable token serves as cryptographic verification of the cryptographically verifiable token;
determining, based at least in part on the one or more parameters and the cryptographically verifiable token, contextual message information associated with at least the client device;
determining, based at least in part on the contextual message information, whether to generate an image with a customized message; and
performing one of:
generating, and sending to the client device, an image with no customized message in response to determining not to generate an image with a customized message; or
in response to determining to generate an image with a customized message:
generating, based at least in part on the contextual message information, a customized message related to the user of the client device, and
generating, and sending to the client device, an image that includes the customized message,
wherein:
the first content server operates in a first network domain, and the second content server operates in a second network domain distinct from the first network domain; and
the second content server is configured with processor-executable instructions to perform operations prior to reception of the request for the image at the first content server, the operations comprising:
receiving, from the client device, a webpage request;
determining contextual information based at least in part on the webpage request;
generating the one or more parameters based at least in part on the contextual information;
generating a container webpage comprising an image link,
wherein the image link comprises the one or more parameters; and
sending, to the client device, the container webpage.

2. The system of claim 1, wherein:
the contextual message information is further associated with the user of the client device; and
the customized message includes a message that is personalized for the user of the client device.

3. The system of claim 2, wherein:
the system further comprises the client device, wherein the client device comprises one or more third processors; and
the one or more third processors are configured with processor-executable instructions to perform operations comprising:
sending, to the second content server, the webpage request;
receiving, from the second content server, the container webpage comprising the image link;
initiating rendering of the container webpage; and
subsequent to initiating rendering of the webpage data:
using the image link, sending the request for the image to the first content server;
receiving, from the first content server, one of the image that includes the customized message or the image with no customized message; and
rendering, on a display of the client device, one of the image that includes the customized message or the image with no customized message.

4. The system of claim 3, wherein the one or more third processors are configured with processor-executable instructions to perform operations such that rendering one of the image that includes the customized message or the image with no customized message further comprises rendering one of the image that includes the customized message or the image with no customized message without refreshing the container webpage.

5. The system of claim 3, wherein the client device does not support or has disabled one or more asynchronous data fetching protocols, wherein the one or more asynchronous data fetching protocols enable the client device to obtain, from the first content server, content that is included in the container webpage independently of rendering the container webpage.

6. A system comprising:
a first server comprising one or more first processors and a second server comprising one or more second processors, the first server configured with processor-executable instructions to perform operations comprising:

receiving, from a client device, a request for an image, wherein the request comprises one or more parameters related to an image link and comprises a cryptographically verifiable token that is decryptable by the first server, wherein the one or more parameters and the cryptographically verifiable token are generated by the second server;

determining, based at least in part on the one or more parameters and the cryptographically verifiable token, contextual message information associated with at least a user of the client device;

generating an image based at least in part on the contextual message information; and sending, to the client device, the image, wherein:

the first server operates in a network domain, the second server operates in another domain distinct from the network domain of the first server, and the second server is configured with processor-executable instructions to perform operations prior to reception of the request for the image by the first server, the operations comprising:

receiving, from the client device, a page request;

determining contextual information based at least in part on the page request;

generating the one or more parameters based at least in part on the contextual information;

generating a container page comprising the image link, wherein the image link comprises the one or more parameters; and sending the container page to the client device.

7. The system of claim 6, wherein the first server is configured with processor-executable instructions to perform operations such that generating the image based at least in part on the contextual message information comprises:

generating a personalized message addressed to the user of the client device based at least in part on the contextual message information; and generating the image based at least in part on the personalized message.

8. The system of claim 6, wherein the first server is configured with processor-executable instructions to perform operations such that the request for the image received from the client device is not received via an asynchronous data exchange protocol.

9. The system of claim 6, wherein the one or more parameters comprises at least one of an identification of the user of the client device, an identification of the second server, information regarding a web session conducted between the client device and the second server, state information regarding the second server, state information regarding the client device, a browsing history of the client device, or the cryptographically verifiable token digitally signed by the second server.

10. The system of claim 6, wherein the first server is configured with processor-executable instructions to perform operations such that generating the image based at least in part on the contextual message information comprises:

determining, based at least in part on the contextual message information, to send a customized message to the user of the client device; and generating an image comprising the customized message.

11. The system of claim 6, wherein the first server is configured with processor-executable instructions to perform operations such that generating the image based at least in part on the contextual message information comprises:

determining, based at least in part on the contextual message information, that a user of the client device is required to confirm information;

generating a customized message indicating an action that the user of the client device is required to take in order to confirm the information; and generating the image such that the image comprises the customized message.

12. The system of claim 6, wherein the first server is configured with processor-executable instructions to perform operations further comprising:

determining that the one or more parameters comprises security information from the second server; and determining that the security information from the second server is valid.

13. The system of claim 12, wherein the first server is configured with processor-executable instructions to perform operations such that the security information comprises the cryptographically verifiable token, said token digitally signed using one of a symmetrical key shared between the first server and the second server or a private/public key pair related to the first server and the second server.

14. The system of claim 12, wherein:

the security information comprises timing information; and the first server is configured with processor-executable instructions to perform operations such that determining that the security information from the second server is valid comprises determining that that the security information from the second server is valid based at least in part on the timing information.

15. A computer-implemented method comprising:

receiving, by a first server from a client device, a request for an image, wherein the request comprises one or more parameters related to an image link and comprises a cryptographic token, the one or more parameters and cryptographic token generated by a second server;

determining, by the first server, contextual message information based at least in part on the one or more parameters and the cryptographic token;

generating, by the first server, a customized image based at least in part on the contextual message information; and sending, from the first server to the client device, the customized image, wherein the first server operates in a first network domain, and the second server operates in a second network domain distinct from the first network domain;

wherein the second server is configured with processor-executable instructions to perform operations prior to reception of the request for the image by the first server, the operations comprising:

receiving, from the client device, a page request;

determining contextual information based at least in part on the page request;

generating the one or more parameters based at least in part on the contextual information;

generating a container page comprising the image link, wherein the image link comprises the one or more parameters; and sending the container page to the client device.

16. The computer-implemented of claim 15, wherein determining, by the first server, the contextual message information comprises determining an identity of a user of the client device based at least in part on the one or more parameters.

17. The computer-implemented of claim 16, wherein generating, by the first server, the customized image based at least in part on the contextual message information comprises:
- generating, by the first server, a customized message based at least in part on the identity of the user of the client device; and
- generating, by the first server, the customized image such that the customized image includes the customized message.

18. The computer-implemented of claim 15, wherein the client device does not support or has disabled one or more asynchronous data fetching protocols, wherein the one or more asynchronous data fetching protocols enable the client device to obtain, from the first server, content that is included in the container page independently of rendering the container page.

19. The computer-implemented of claim 18, wherein the first server is not in direct communication with the second server.

\* \* \* \* \*

UNITED STATES PATENT AND TRADEMARK OFFICE
CERTIFICATE OF CORRECTION

| | | |
|---|---|---|
| PATENT NO. | : 9,843,576 B1 | |
| APPLICATION NO. | : 14/973635 | |
| DATED | : December 12, 2017 | |
| INVENTOR(S) | : Jin Peng | |

It is certified that error appears in the above-identified patent and that said Letters Patent is hereby corrected as shown below:

In Column 1 at Line 11, change "Javascripe" to --Javascript®--.

In Column 1 at Line 14, change "Javascripe" to --Javascript®--.

In Column 24 at Line 30, change "that that" to --that--.

Signed and Sealed this
Tenth Day of April, 2018

Andrei Iancu
*Director of the United States Patent and Trademark Office*